Feb. 19, 1929.  L. DESROCHERS  1,702,688

POWER TRANSMISSION GEAR

Filed Oct. 5, 1927   2 Sheets-Sheet 1

INVENTOR
LOUIS. DESROCHERS
BY Fetherstonhaugh & Co
ATTORNEYS

Feb. 19, 1929.  L. DESROCHERS  1,702,688
POWER TRANSMISSION GEAR
Filed Oct. 5, 1927  2 Sheets-Sheet 2

INVENTOR
LOUIS DESROCHERS
ATTORNEYS

Patented Feb. 19, 1929.

1,702,688

UNITED STATES PATENT OFFICE.

LOUIS DESROCHERS, OF MONTREAL, QUEBEC, CANADA.

POWER-TRANSMISSION GEAR.

Application filed October 5, 1927. Serial No. 224,202.

This invention relates to new and useful improvements in power transmission devices, and particularly to devices for transmitting power from a rotating axle to a generator supported from the body of a vehicle.

The main object of the invention is to provide a simple, durable, and efficient device which will drive the generator in one direction only when the vehicle is being moved in the forward or rearward directions.

Another object is to provide a device which will eliminate repairs and replacements as far as possible and insure a constant delivery of power between the car axle and the generator.

A further object is to provide a serviceable electric equipment for lighting and kindred purposes in trains, and the like.

According to my invention the generator is fixed to the vehicle and power is transmitted from the axle to the generator through geared wheels and clutches, the clutches being so constructed that they are brought into operation by the turning movement of the axle to drive the generator in one direction only. The clutches are so constructed that they engage and disengage with the driving mechanism without jarring or interfering with the free movement of the armature shaft of the generator.

In the drawings which illustrate my invention:—

Figure 1:
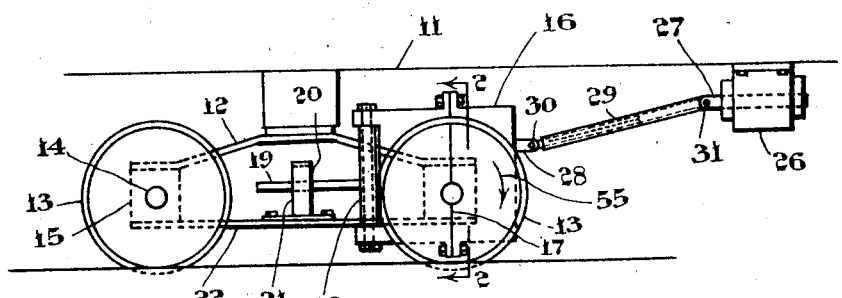
Figure 1 is a side elevation showing my improved power transmission device.
Figure 2:
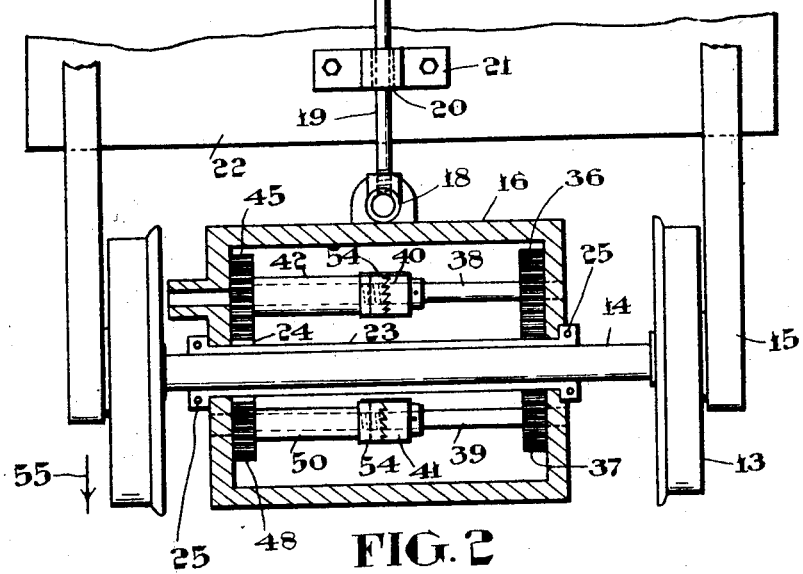
Figure 2 is an enlarged sectional plan taken on the line 2—2 Figure 1.
Figure 3:
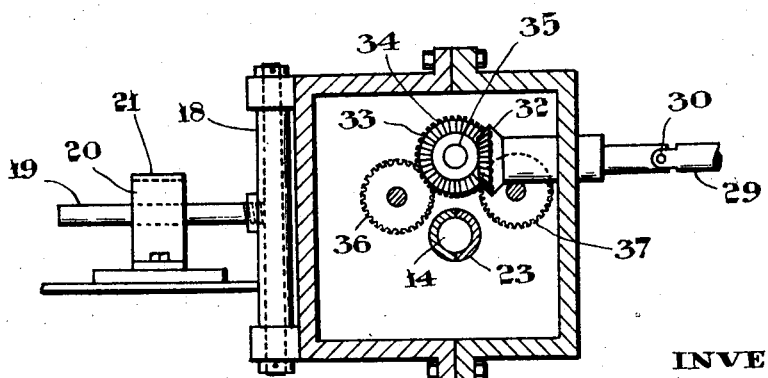
Figure 3 is an interior end view of the gear box of my improved power transmission device.
Figure 4:
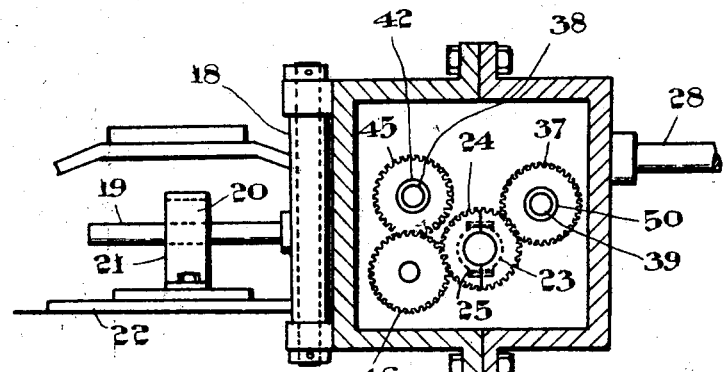
Figure 4 is an exterior end view of the box shown in Figure 3.
Figure 5:
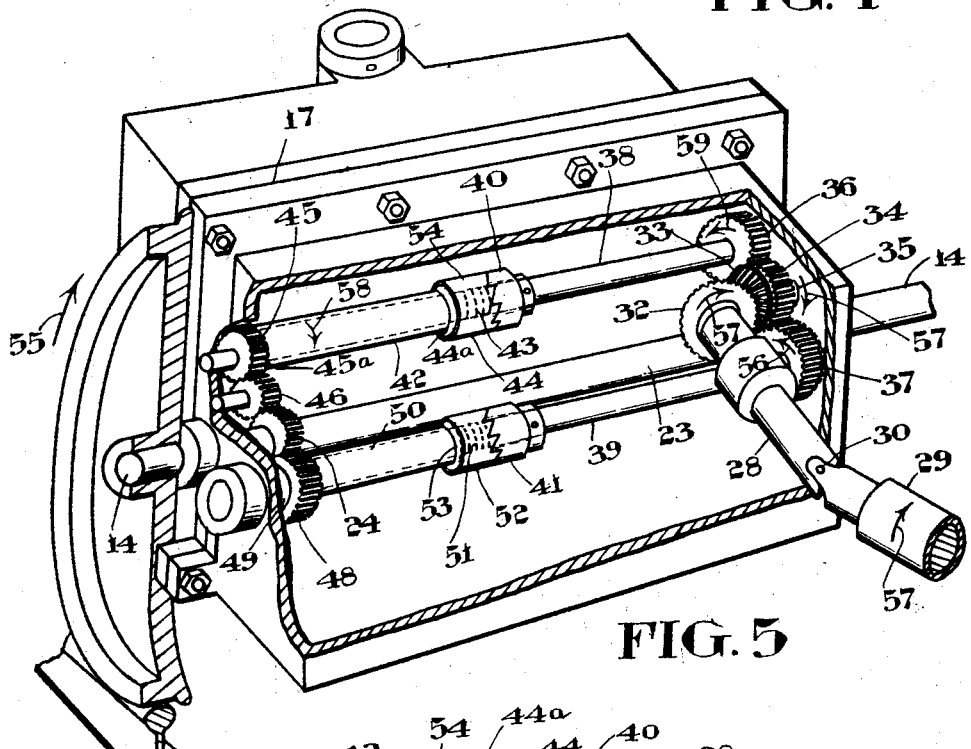
Figure 5 is a perspective view of the gearing with the casing broken away.
Figure 6:
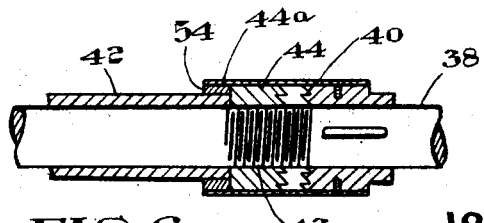
Figure 6 is an enlarged part sectional elevation of one of the clutches.

Referring more particularly to the drawings, 11 designates the base of the vehicle which is mounted on the truck 12, in the usual manner. The truck wheels 13 are secured to the axles 14 and rotate in bearings 15 secured to the truck. Mounted on the axle 14 is the gear casing 16 which is split along the line 17 to allow easy access to the gears enclosed therein, and to prevent rotation of the casing with the axle a sleeve 18 is bolted to the casing and extending outwardly from the sleeve and secured thereto is the pin 19 which rides on a slot 20 formed in a bracket 21 secured to the truck bolster 22. Secured to a split sleeve 23 is a pinion 24, and said sleeve is clamped to the axle by means of the bolts 25. The generator 26 is secured to the underside of the car body, and its armature shaft 27 is connected to a spindle 28 passing through the casing by means of a telescopic shaft 29. The shaft 29 has universal joints 30 and 31 forming the connections. Secured to the spindle 28 is the bevel toothed wheel 32 which is driven by a bevel toothed pinion 33 which is secured to a driving pinion 34 mounted on a pin 35 passing through the casing. Gearing with the pinion 34 are the toothed wheels 36 and 37 which are secured to the shafts 38 and 39, respectively, positioned one on each side of the axle. The shafts are rotatably mounted in suitable bearings formed in the end walls of the casing. Secured to the shaft 38 is the saw tooth clutch member 40, and secured to the shaft 39 is the saw toothed clutch member 41. Rotatably mounted on the spindle 38 is the sleeve 42, one end 43 of which is threaded to receive a threaded clutch member 44 adapted to engage with the clutch member 40. The horizontal movement of the clutch member 44 is controlled by the collar 44ª secured to the sleeve 42. Secured to the end 45ª of the sleeve is the tooth pinion 45, which engages with an idler tooth wheel 46 which is driven by a toothed pinion 24 secured to the axle. Pinion 24 also engages with a toothed wheel 48 secured to one end 49 of a sleeve 50 rotatably mounted on the shaft 39. The other end 51 of the sleeve 50 is threaded to receive an internally threaded ratchet tooth clutch member 52 adapted to engage with the clutch member 41. A collar 53 is secured to the sleeve to control the horizontal movement of the clutch member 52. Friction members 54 are secured to the movable or driven clutch members to cause same to move on the threaded portions of the sleeve to bring the clutches into and out of operation.

In operation when the car wheel moves in the direction indicated by the arrow 55, the teeth of the clutch member 52 are adapted to engage with the teeth of the clutch 41, thereby driving the wheel 36 and shaft 39 in the direction of arrow 56, and driving the idler and its pinion in the direction of arrow 57, which is the driving movement for operating the generator. At the same time, the sleeve 42 is driven in the direction of arrow 58 to draw the clutch on the sleeve out of engagement with the clutch 40, thus allowing shaft 38 to revolve in the opposite direction. When the motion of the travelling wheel is reversed, the clutch members 52 and 41 disengage and members 44 and 40 are brought into engagement to turn the shaft 38 in the direction of arrow 59, and the armature driving shaft in the direction of arrow 57. It will be seen that the direction of rotation of the armature shaft will be the same whether the movement of the train is in the backward or forward direction. It will also be seen that the movement is very simple and the clutches automatically go into and out of action without jar which would tend to affect the teeth. It will also be seen that if the wheels were to skid through braking, that no jar would come on the gear and there would be no sudden stoppage of the generator armature as the momentum of same would automatically throw out both clutches.

The device is very easily applied to railway equipment and provides an efficient, robust and serviceable electrical generating device for lighting and kindred purposes on trains and the like, and in which the generator is moved or rotated in one direction only. By providing a telescopic connection between the generator and its axle driving means and also by providing universal joints between the ends of the telescopic shafts, the armature shaft and the spindle, a flexible connection is obtained which will allow variations to be made between the vehicle body and the truck, without affecting the operation of the mechanism. The device shown is for illustrative purposes only and many modifications may be made therein without departing from the spirit of the invention.

Having thus described my invention, what I claim is:—

1. In a power transmission device, an axle, a pair of sleeves rotatably mounted on shafts positioned one on each side of the axle, driving means between the axle and the sleeves, clutch means for driving the shafts through the medium of the sleeves, and means driven by the shafts for driving a generator.

2. In a power transmission device for railway cars, a bogie, a driving axle mounted therein, a pair of sleeves rotatably mounted on shafts passing through the bogie, driving means between the sleeves and the axle, a generator secured to the car, a driving connection between the shafts and the generator, and a ratchet toothed clutch connecting each shaft and sleeve and arranged to drive the generator in one direction only independent of the direction of rotation of the axle.

3. In a power transmission device for railway cars, a bogie, a driving axle rotatably mounted therein, a pair of sleeves rotatably mounted on shafts rotatably mounted in the bogie, a gear wheel secured to the axle and adapted to drive the sleeves in opposite directions through suitable gearing, a generator secured to the car, gear driving means between the generator and the shafts, and clutches between the sleeves and the shafts to drive the generator in one direction irrespective of the direction of rotation of the axle.

4. In a power transmission device for railway cars, a bogie, a driving axle mounted therein, a pair of sleeves rotatably mounted on axles rotatably mounted in the bogie, a gear wheel secured to the axle adapted to rotate the sleeves in opposite directions through suitable gearing, a generator secured to the bogie, a universal driving connection between the generator and the shafts, and ratchet toothed clutches between the sleeves and the shafts to drive the generator in one direction irrespective of the direction of rotation of the axle.

5. In a power transmission device for railway cars, a bogie, a driving axle mounted therein, a pair of sleeves rotatably mounted on axles rotatably mounted in the bogie, geared driving connection between the axle and the sleeves to drive same in opposite directions, a generator secured to the car, a gear universal connection between the shafts and the generator including a telescopic shaft to allow for deflection of the car with respect to the bogie, and ratchet toothed clutches between the sleeves and their supporting shafts arranged to rotate the generator in one direction only irrespective of the rotation of the driving axle.

In witness whereof, I have hereunto set my hand.

LOUIS DESROCHERS.